Nov. 4, 1930.  V. V. MESSER  1,780,208

METHOD OF MAKING PUMP MEMBERS

Filed Dec. 7, 1929  2 Sheets-Sheet 1

Inventor
V. V. Messer,
By Robert M. Pierson,
Attorney

Nov. 4, 1930.  V. V. MESSER  1,780,208
METHOD OF MAKING PUMP MEMBERS
Filed Dec. 7, 1929   2 Sheets-Sheet 2
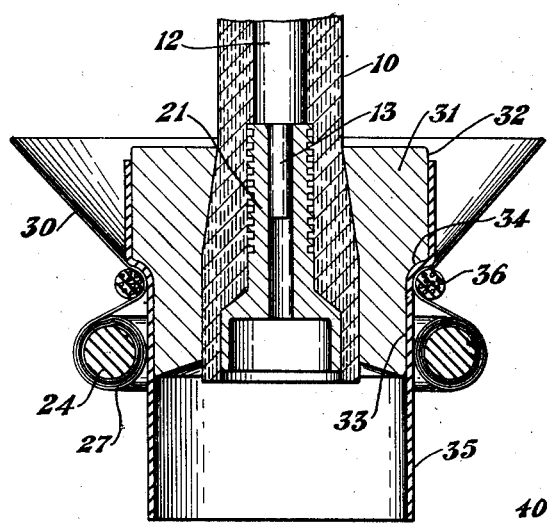
Fig.5
Fig.6
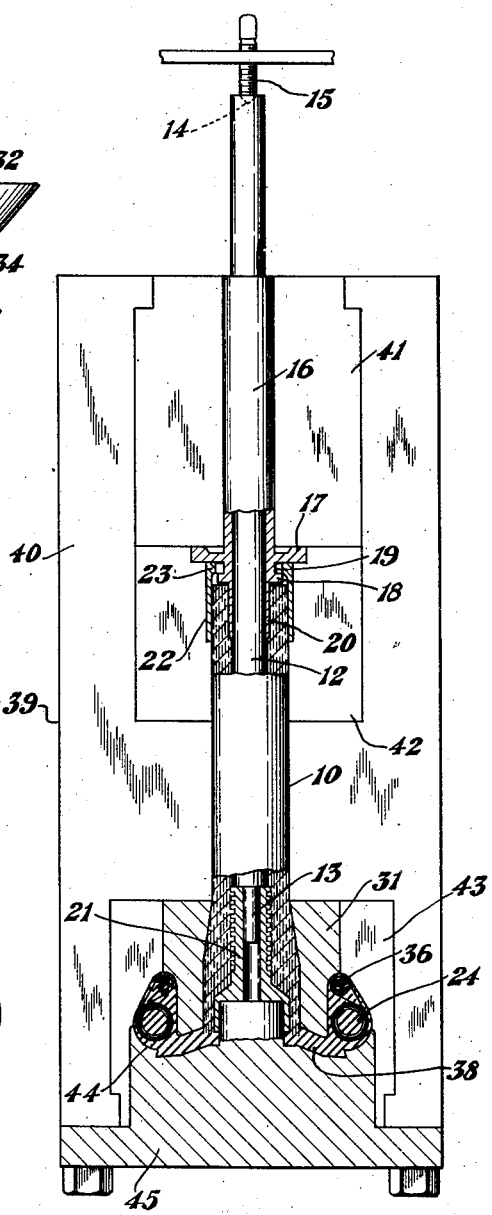
Fig.7
Inventor
V. V. Messer,
By Robert M. Pierson,
Attorney Patented Nov. 4, 1930

1,780,208

UNITED STATES PATENT OFFICE

VLADIMIR VICTOR MESSER, OF NEW YORK, N. Y., ASSIGNOR TO SEIBERLING RUBBER COMPANY, OF BARBERTON, OHIO, A CORPORATION OF DELAWARE

METHOD OF MAKING PUMP MEMBERS

Application filed December 7, 1929. Serial No. 412,504.

This invention relates to the manufacture of the bodies of flexible pumping devices such as internal pneumatic-tire inflating pumps and parts thereof or analogous structures. Its object is to provide a novel method of procedure whereby said structures and parts may be rapidly manufactured at a relatively-low cost, and an efficient and durable product obtained.

Of the accompanying drawings, Fig. 1 is a side elevation, partly in section, illustrating an early stage in the manufacture of a flexible, reinforced ring forming a part of the product.

Fig. 5 is a vertical section of the parts illustrated in Fig. 4 together with additional members of the bead or ring structure in an intermediate stage of fabrication.

Fig. 6 is a similar view illustrating the same parts at a later stage where the laying-up of the bead structure has been completed, together with a rubber web member in position to be assembled with the bead and stem.

Fig. 7 is a longitudinal section of the completely fabricated product in a vulcanizing mold.

Figure 1:
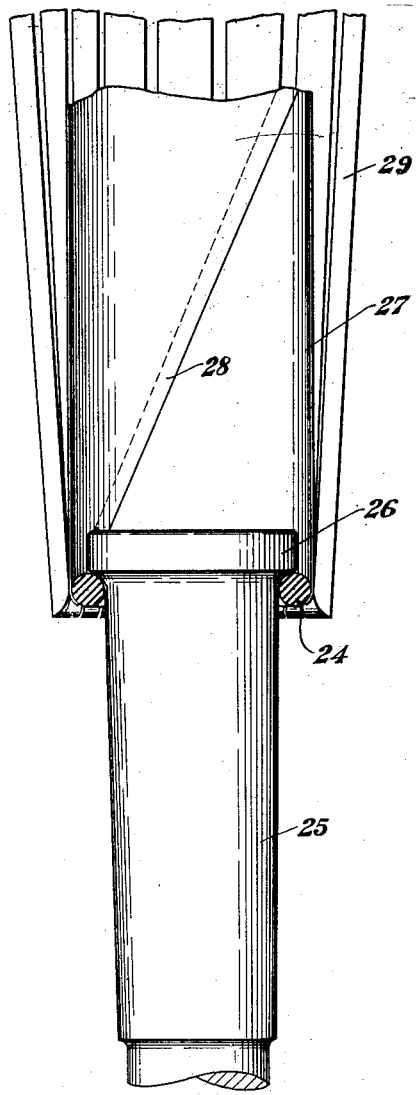

The product illustrated is the body of a tire-inflating pump such as described in my copending application Ser. No. 413,908, filed Dec. 13, 1929 filed concurrently herewith, said body comprising a reinforced flexible stem having metallic parts incorporated therewith, and a flexible, reinforced, sucker-foot pumping member integrally united with said stem at one end thereof.

In the fabrication of the flexible tubular stem 10, which is a hose-like member made by wrapping a sheet or sheets of thin, close-texture, straight-laid, rubberized fabric in successive plies or convolutions 11 upon each other, I provide a straight metallic rod mandrel 12 having a reduced portion 13 at one end and a conical socket 14 at the other end to receive the conical end of a retaining screw 15 (Fig. 7), and I pass the mandrel through a tubular brass fitting 16 which is mainly to form the external stem of the inflating pump. Fitting 16 has a flange 17 for engaging the interior side of the wall of the inner tube, a shorter flange 18 separated therefrom by a locking groove 19, and a terminal projecting member or nozzle 20 for entering the hose-like, flexible stem body 10. On the mandrel projection 13 is mounted a tubular brass fitting 21 for embedment in the outer end of the stem body 10, said fitting having an externally corrugated shank for interlocking with the said stem body, and an enlarged hollow head for receiving a check-valve casing. Screw 15 holds the mandrel 12 and the fitting 21 together against the pressure of the rubber during the molding process.

The flexible stem 10 is then formed around the mandrel 12, the nozzle 20 of the external stem 16, and the end fitting 21, with a partially tapered enlargement at its inner end to cover the head and adjacent parts of the end fitting 21. While it is not essential to have the external stem 16 present on the mandrel when the hose-like body is being wound thereon, since the nozzle projection 20 could be inserted in said body after the winding, it is preferred to form the windings around said nozzle member and thus cause said member to make its own recess in the stem body 10. In the latter case, after the winding is complete, the metallic stem 16 is withdrawn from the mandrel 12 and stem body 10 for the purpose of surrounding the outer end of the latter with a metallic ferrule 22, which is originally of larger diameter than its ultimate size and is formed with an inwardly-projecting terminal locking flange 23. The stem 16 is then replaced and its flange 18 passes through the ferrule flange 23 as nozzle member 20 reenters the stem body 10.

Figure 2:
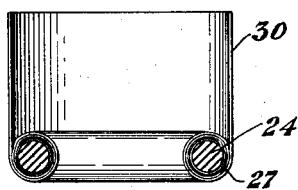
Fig. 2 is a section illustrating the fabric-covered core with extended fabric skirt.

The reinforced rubber bead member for the sucker-foot is separately formed by operations beginning as illustrated in Fig. 1. A core ring 24 of rubber composition which will vulcanize to a semi-soft condition is passed around a tapered mandrel 25 and against the shoulder of an end flange 26 thereon, and around said core is placed a tubular, rubberized sheet 27 of straight-laid, close-mesh, fine fabric, such as balloon fabric, with its edges cut on the bias and united in a diagonal splice 28, and one end thereof is stuck on the outside of the core. The fabric tube 27 is then partially rolled upon itself down the mandrel 25 and around the core 24, preferably with the aid of a collapsible rolling tool such as a metal ring having downwardly-projecting flexible jaws 29 which may be grasped in the operator's hand to press them against the fabric tube and the underlying core while the hand tool is forced endwise down the mandrel to perform the rolling operation. The core 24 with the plies of fabric 27 rolled around it, and a tubular skirt 30 of said fabric extending in a tangent from its outer periphery, is illustrated in Fig. 2.

Figure 3:
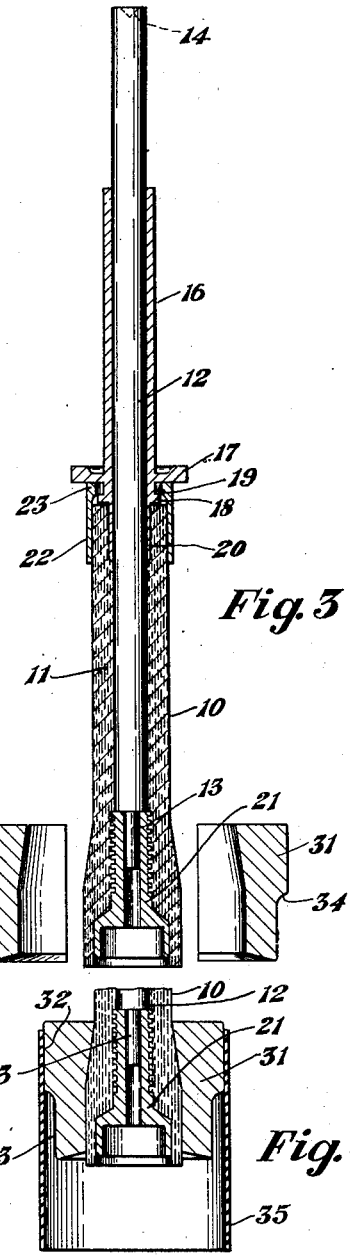
Fig. 3 is a vertical section showing a flexible pump stem laid upon a mandrel with associated metallic parts, and a sectional molding mandrel in position to be assembled thereon.
Figure 4:
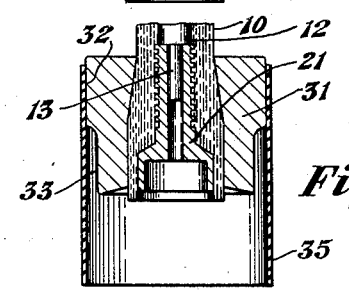
Fig. 4 is a partial vertical section showing the molding mandrel assembled on the stem and surrounded by a rubber sheet.

The stem structure and covered bead core having thus been fabricated, the two halves 31 of a longitudinally-divided molding mandrel which is internally shaped to fit the enlarged portion of the stem 10 and externally formed with cylindrical portions 32, and 33 respectively of larger and smaller diameters, and a connecting shoulder 34, are then registered with the end portion of stem 10 which contains the brass fitting 21, as represented in Fig. 3, and closed around said end portion as shown in Fig. 4. A tubular sheet 35 of vulcanized soft rubber composition is then placed around the mandrel as indicated in the latter view.

The fabric-covered and skirted core 24 is now placed around the tubular sheet 35, whose depending portion may be manually contracted against the smaller portion 33 of the mandrel 31 for that purpose. Upon the fabric skirt 30, under the mandrel shoulder 34, is then wound, in a plurality of turns, a narrow strip of rubberized thread fabric to form a reinforcing core 36, conventionally shown as of circular section in the drawings, although its actual shape may be somewhat non-circular. The act of winding partially folds the skirt 30 around this core and when the core is fully wound, the folding is then completed by bringing the skirt downwardly over the outer side thereof and its margin is then wrapped partly around the covered core 24 on the outer side of the latter, thus enclosing core 36 in an annular loop 37 of the extended fabric covering 27 of core 24 and anchoring it to the outer side of the covered lower core as indicated in Fig. 6. The fabrication of the bead is then completed by bringing the edges of the rubber sheet 35 together in a lapped splice on the outer side of said bead to fully enclose the covered cores as shown in this view.

A flat ring 38 of vulcanizable, soft-rubber composition, in one or more plies, shown in position for assembly in Fig. 6, is then applied as an end facing over the end of mandrel 31, upon the rubber covering 35 of the bead and upon the end of the rubberized fabric stem 10 to form a connecting web member for the sucker-foot of the pump body.

The assembled pump body structure, together with the mandrels 12 and 31, is then placed in a vulcanizing mold 39, partly illustrated in Fig 7, said mold including parts longitudinally divided in a plane transverse to the dividing plane of the mandrel 31, namely casing parts 40 adapted to mold the middle portion of stem 10, and other mold parts enclosed in said casing parts and including members 41 for holding the metallic stem 16, adjacent members 42 abutting the members 41 along a transverse plane coincident with the outer face of the flange 17 for holding said flange and the ferrule 22 and for molding a portion of stem 10, and members 43 for holding the molding mandrel 31 and the end mold member and for molding the outer sides of the bead of the sucker-foot, designated as a whole by the numeral 44, together with an end mold plate 45 for molding the concave end face of the sucker-foot and the adjacent under sides of the bead, the mold being held together by suitable bolts.

Heating and flow of the rubber under the molding pressure causes the filling of voids in the mold and structure of the pump body, and integrally unites all parts of the latter. When vulcanization is complete, the article and associated mandrels are removed from the outer mold and the mandrel 31 is withdrawn. The ferrule 22 is then contracted to compress the outer end of stem 10 and interlock the flange 23 of said ferrule in the groove 19 of the metallic stem 16. The pump body is then complete and the rod mandrel 12 is finally withdrawn.

The steps of this process might be more or less varied without departing from the principles involved, and the invention could be employed in whole or in part in the manufacture of analogous articles and parts thereof.

I claim:

1. The method of making reinforced flexible rings which comprises forming a flexible, annular core, wrapping fabric thereon, applying a parallel, flexible reinforcement to an unwrapped portion of said fabric, and enclosing said reinforcement in the fabric.

2. The method of making reinforced, flexible, composite rings which comprises wrapping a sheet of rubberized fabric upon itself around a flexible core, leaving a portion of said sheet extending as a skirt, winding a reinforcement on said skirt folding said skirt around the reinforcement, and vulcanizing the structure.

3. The method of making reinforced, flexible, composite rings which comprises making a core having a rubberized fabric skirt, placing a rubber sheet around a mandrel, surrounding it with the skirted core, winding a reinforcement on the skirt, folding the skirt around the reinforcement, wrapping the rubber sheet around the core and the covered reinforcement, and vulcanizing the structure.

4. The method of making reinforced, flexible, composite rings which comprises wrapping an annular core in part of a fabric tube, leaving the remaining portion of said tube extended as a skirt from the outer periphery of the wrapped core, laying a second core on said skirt, folding back said skirt over the second core, and securing it to the outer periphery of the wrapping on the first core.

5. The method of making reinforced, flexible, composite rings which comprises wrapping a tubular sheet of rubberized fabric upon itself around a rubber core, leaving a skirt of said fabric extending from the outer periphery, wrapping a rubber sheet upon a mandrel, surrounding said rubber sheet with the skirted core, winding a reinforcement of rubberized cords upon said sheet, folding the skirt around the reinforcement and upon the wrapped core, enclosing the core and the covered reinforcement in the rubber sheet, and vulcanizing the structure.

6. The method of making flexible, tubular structures which comprises wrapping rubberized fabric upon itself to form a hose-like stem, separately forming an annular, rubberized bead, assembling said bead and a rubber web with the stem, and vulcanizing the parts together.

7. The method of making composite structures which comprises forming a tubular, flexible stem of vulcanizable material, assembling said stem with an external molding mandrel, placing a vulcanizable bead around said mandrel, connecting said bead and stem with a vulcanizable facing, and vulcanizing said parts together.

8. The method of making composite structures which comprises wrapping rubberized fabric upon itself around a rod mandrel to form a tubular stem, incorporating a metallic member in one end of the stem, applying the parts of a longitudinally-divided molding mandrel externally to that end of the stem, placing an annular, rubberized foot member around said molding mandrel, connecting said foot member and stem with a rubber foot web, vulcanizing the parts together upon the mandrels, and withdrawing the mandrels.

9. The method of making composite structures which comprises applying a tubular, metallic end fitting to a rod mandrel, wrapping rubberized fabric upon itself around said mandrel and fitting to form a tubular stem, applying a molding mandrel externally to the end of said stem containing the fitting, forming a rubberized foot bead around said mandrel, connecting said bead and stem with a rubber foot web, vulcanzing the parts together in a mold, removing the article therefrom and withdrawing the mandrels.

10. The method of making composite, tubular structures which comprises forming a flexible stem around a mandrel, surrounding said stem with a metal ferrule, incorporating the end of a metallic member within said stem, contracting said ferrule upon the stem and metallic member, and withdrawing the mandrel.

11. The method of making composite, tubular structures which comprises passing a mandrel through a tubular, metallic end fitting, winding rubberized fabric around said mandrel and end fitting to form a stem, withdrawing the end fitting, surrounding the stem with a metal ferrule, replacing the end fitting, vulcanizing the rubberized fabric and metal parts together, contracting said ferrule upon the stem and end fitting, and then withdrawing the mandrel.

12. The method of making composite, tubular structures which comprises inserting the end of a rod mandrel in the aperture of a tubular, metallic end fitting, wrapping rubberized fabric around said mandrel and fitting to form a flexible, tubular stem, placing the parts of a sectional molding mandrel around the end of said stem which contains said fitting, separately covering a rubber core with rubberized fabric, leaving a skirt of said fabric extending back from its outer periphery, placing a tubular sheet of rubber around said molding mandrel, placing the skirted core around said rubber sheet, winding a reinforcement upon the fabric skirt in back of the core, folding said skirt over said reinforcement, applying it to the outer side of the core covering, enclosing the covered core and reinforcement in the rubber sheet, connecting the rubber sheet with the end of the stem by a rubber web member, vulcanizing the structure in a mold, removing it therefrom and withdrawing said mandrels.

In witness whereof I have hereunto set my hand this 4th day of December, 1929.

VLADIMIR VICTOR MESSER.